United States Patent
Wang et al.

(10) Patent No.: US 11,954,686 B2
(45) Date of Patent: Apr. 9, 2024

(54) INFORMATION SHARING METHODS AND SYSTEMS

(71) Applicant: ALIPAY (HANGZHOU) INFORMATION TECHNOLOGY CO., LTD., Zhejiang (CN)

(72) Inventors: Xinmin Wang, Hangzhou (CN); Renhui Yang, Hangzhou (CN); Yuan Chen, Hangzhou (CN); Wenyu Yang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 70 days.

(21) Appl. No.: 17/364,719

(22) Filed: Jun. 30, 2021

(65) Prior Publication Data
US 2021/0326889 A1    Oct. 21, 2021

(30) Foreign Application Priority Data
Aug. 31, 2020    (CN) .......................... 202010901138.4

(51) Int. Cl.
*G06Q 20/40*    (2012.01)
*G06Q 20/10*    (2012.01)
*G06Q 20/38*    (2012.01)

(52) U.S. Cl.
CPC .......... *G06Q 20/4016* (2013.01); *G06Q 20/10* (2013.01); *G06Q 20/38215* (2013.01);
(Continued)

(58) Field of Classification Search
CPC ............. G06Q 20/10; G06Q 20/38215; G06Q 20/3825; G06Q 20/3827; G06Q 20/4014; G06Q 20/4016
(Continued)

(56) References Cited

U.S. PATENT DOCUMENTS 10,484,178 B2 *   11/2019   Andrade
10,929,936 B1 *    2/2021   Duranske et al.
(Continued)

FOREIGN PATENT DOCUMENTS

CN    110457875    11/2019
CN    111090876     5/2020
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Neha Patel
*Assistant Examiner* — Yin Y Choi
(74) *Attorney, Agent, or Firm* — Fish & Richardson P.C.

(57) ABSTRACT

Examples in this application disclose information sharing methods, media, and systems. One example computer-implemented method includes receiving, by a trusted execution environment (TEE), a first sharing request from a first institution and a second sharing request from a second institution, where the first sharing request comprises a user identity of a first user and first anti-money laundering (AML) risk information and the second sharing request comprises a user identity of a second user and second AML risk information, comparing the user identity of the first user with the user identity of the second user, in response to that the user identity of the first user is the same as the user identity of the second user, combining the first AML risk information and the second AML risk information, and sending the combined first AML risk information and second AML risk information to the first institution and the second institution.

20 Claims, 4 Drawing Sheets

(52) U.S. Cl.
CPC ..... *G06Q 20/3825* (2013.01); *G06Q 20/3827* (2013.01); *G06Q 20/4014* (2013.01)

(58) Field of Classification Search
USPC .......................................................... 705/64
See application file for complete search history.

(56) References Cited

U.S. PATENT DOCUMENTS

| | | |
|---|---|---|
| 11,188,981 B1* | 11/2021 | Shiu |
| 2015/0088752 A1* | 3/2015 | Howe |
| 2019/0156301 A1* | 5/2019 | Bentov et al. |
| 2020/0034839 A1 | 1/2020 | Soundararajan et al. |
| 2020/0065814 A1* | 2/2020 | Fang et al. |
| 2020/0167773 A1* | 5/2020 | Cervenka et al. |
| 2022/0122170 A1* | 4/2022 | Du |

FOREIGN PATENT DOCUMENTS

| | | |
|---|---|---|
| CN | 111092726 A | 5/2020 |
| CN | 111415158 | 7/2020 |
| CN | 111538794 | 8/2020 |
| WO | WO2019246626 A1 * | 6/2018 |
| WO | WO2019246626 A1 * | 12/2019 |
| WO | WO2021158169 A1 * | 2/2020 |
| WO | WO2021158169 A1 * | 8/2021 |

OTHER PUBLICATIONS

Nakamoto, "Bitcoin: A Peer-to-Peer Electronic Cash System," www.bitcoin.org, 2005, 9 pages.

* cited by examiner

INFORMATION SHARING METHODS AND SYSTEMS

CROSS-REFERENCE TO RELATED APPLICATIONS

This application claims priority to Chinese Patent Application No. 202010901138.4, filed on Aug. 31, 2020, which is hereby incorporated by reference in its entirety.

TECHNICAL FIELD

Embodiments of the present specification belong to the field of blockchain technologies, and in particular, relate to information sharing methods and systems.

BACKGROUND

A blockchain is a new application mode of computer technologies such as distributed data storage, point-to-point transmission, a consensus mechanism, and an encryption algorithm. A blockchain is a chained data structure obtained by combining data blocks in chronological order, and uses a cryptography method to ensure that a distributed ledger cannot be tampered with or forged. Because a blockchain has features such as de-centralization, non-tampering, and autonomy, the blockchain is attracting more attention and more widely applied.

SUMMARY

An objective of the present disclosure is to provide information sharing methods and systems, including:

An information sharing method includes the following: A first institution sends a first sharing request to a privacy computing unit, where the first sharing request includes a user ID of a first user and corresponding first anti-money laundering (AML) risk information; a second institution sends a second sharing request to the privacy computing unit, where the second sharing request includes a user ID of a second user and corresponding second AML risk information; the privacy computing unit matches the user ID of the first user against the user ID of the second user, and if they are consistent, combines the first AML risk information and the second AML risk information for the user ID; and the privacy computing unit sends the combined first AML risk information and second AML risk information to the first institution and the second institution.

By using the solutions in the previously-mentioned embodiments, an anti-money laundering obligatory institution can have more AML risk results, thereby improving a more accurate anti-money laundering audit capability of the anti-money laundering obligatory institution, and improving an overall anti-money laundering audit capability of the industry.

An information sharing system includes: a first institution, configured to send a first sharing request to a privacy computing unit, where the first sharing request includes a user ID of a first user and corresponding first AML risk information; a second institution, configured to send a second sharing request to the privacy computing unit, where the second sharing request includes a user ID of a second user and corresponding second AML risk information; and the privacy computing unit, configured to: match the user ID of the first user against the user ID of the second user, and if they are consistent, combine the first AML risk information and the second AML risk information for the ID; and send the combined first AML risk information and second AML risk information to the first institution and the second institution.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some rather than all of the embodiments of the present specification. All other embodiments obtained by a person of ordinary skill in the art based on the embodiments of the present specification without creative efforts shall fall within the protection scope of the present specification.

Data sharing is often needed by institutions to process services. A single institution is often unable to obtain enough information to process a service, and needs to obtain information from other institutions. For example, many countries require financial institutions to provide anti-money laundering audit results in the requirements of anti-money laundering (AML) compliance. At present, many national central banks and large financial institutions have tried to improve efficiency and accuracy by using blockchains in the field of anti-money laundering and to meet regulatory requirements. Meanwhile, data, as resources, its mobility and accessibility are the foundation of many data applications and industry development. However, privacy protection in data exchange and sharing is a challenge to industry development. The following still uses the previously-mentioned anti-money laundering as an example for description.

Anti-money laundering is a measure to prevent money laundering activities that cover up and conceal sources and nature of earnings from drug crimes, organized crimes of a gangdom, terrorist crimes, smuggling crimes, corruption and bribery crimes, and crimes against financial management order by using various means. Common money laundering paths involve fields such as banking, insurances, securities, and real estate. Most anti-money laundering efforts include three core aspects:

1. Customer identification system. During establishment of a service relationship or a transaction with a customer, the subject of the anti-money laundering obligation shall verify and record an identity of the customer based on an actual and valid identity card, and update the customer's identity information in time during the existence of the service relationship.

2. Large and suspicious transaction report (STR) system. Illegal capital flows are usually characterized by large amounts and abnormal transactions. Therefore, the STR is stipulated in laws. For the amount of transactions that reached certain standard and abnormal transactions without a legitimate purpose, financial institutions are required to report to the anti-money laundering administrative department in a timely method for the purpose of tracing illegal crimes.

3. Customer identity information and transaction record retention rules. The retention rules of customer identity information and transaction records means that financial institutions take the necessary measures to save customer identity information and transaction information for a certain period of time based on laws, and can provide evidence for tracing illegal crimes.

The customer identity identification system, which is commonly referred to as Know Your Customer (KYC), refers to obtaining customer-related identification information, including knowing the identity of the customer when establishing a service with the customer, knowing the purpose of the transaction, knowing the source and whereabouts of the capital, knowing the long term service activities and financial transactions of the customer, etc., which are the bases for anti-money laundering.

The STR system refers to a system that a financial institution reports suspicious transactions to the central bank or the administration of foreign exchange after discovering the suspicious transactions. In addition, the financial institution is obliged to review the suspicious transactions. When a suspected crime is discovered, the financial institution needs to report it to the local police department in time. After a financial institution reviews a suspicious transaction of a user, if it is determined that a transaction risk of the user is high, the financial institution can label the user with a crime label in the STR. Common STR crime labels include, for example, drug crime, organized crime of a gangdom, terrorist crime, smuggling crime, corruption and bribery crime, crime against financial management order, financial fraud crime, and money-laundering crime.

All financial institutions have the obligation to review suspicious transactions. However, information about transactions related to the same user and information about the user are often different among different financial institutions. In this case, STR crime labels labeled by different financial institutions after performing suspicious transaction analysis on the same user may also be different. A better way for a financial institution to label an STR crime label to a user more accurately is to obtain an STR crime label labeled to the same user by another (or more) financial institution. Therefore, there is a need to share STR crime labels of the same user among different financial institutions.

In the previously-mentioned example, STR crime label information sharing is actually also one of AML risk information sharing. AML risk information sharing mainly refers to sharing information related to customer money-laundering risks generated and identified by anti-money laundering policies and procedures, including sharing of customer money-laundering risk level, customer STR crime type code, customer suspicious behavior information, and other information related to money-laundering risk. The following uses the STR crime type code as an example to describe an implementation process of sharing an STR crime label of the same user between different financial institutions, and implementation processes of sharing other AML risk information are similar.

For another example, a customer money-laundering risk level is used as an example. Money-laundering risk levels labeled by different financial institutions after performing suspicious transaction analysis on the same user may also be different. For example, a money-laundering risk labeled by institution A to user A is high, and a money-laundering risk labeled by institution B to user A is medium. A better way for a financial institution to label a money-laundering risk label to a user more accurately is to obtain a money-laundering risk label labeled to the same user by another (or more) financial institution. Therefore, there is a need to share money-laundering risk labels of the same user among different financial institutions.

Customer suspicious behavior information in AML risk information sharing is similar.

Figure 1:
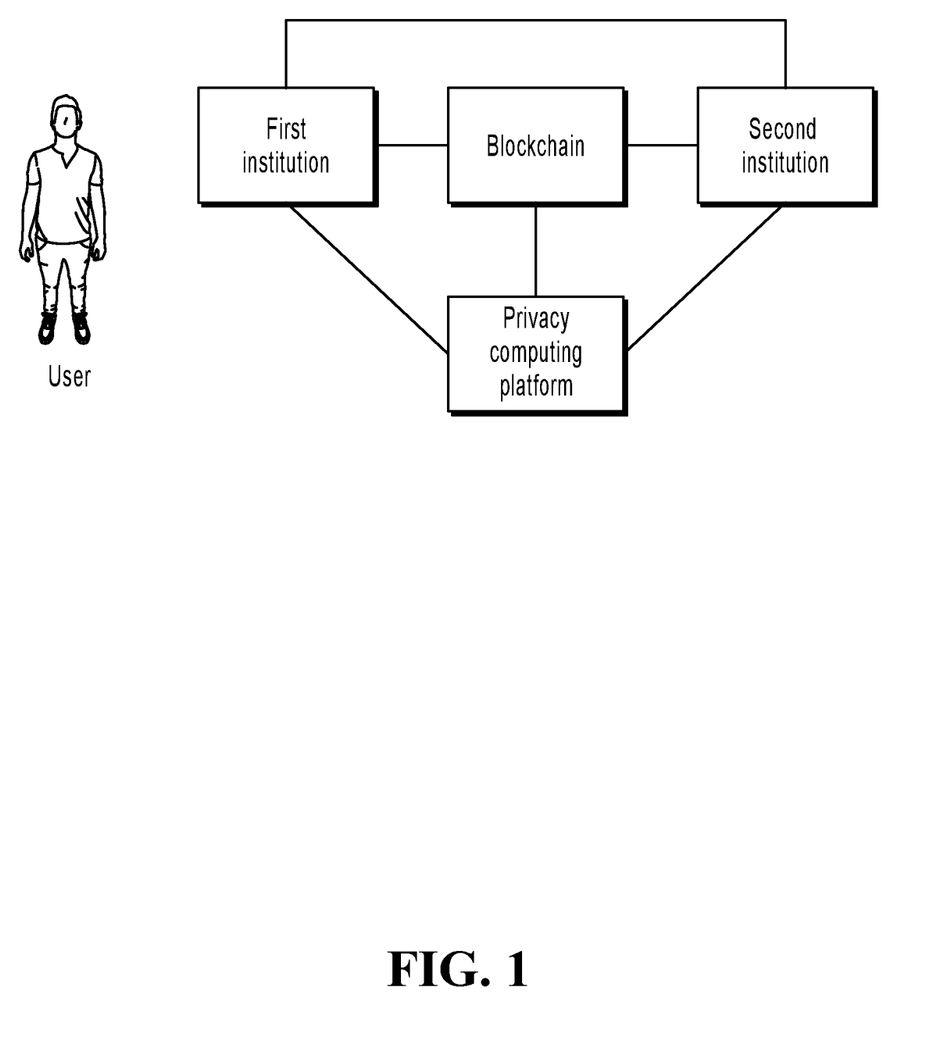
FIG. 1 is a schematic diagram illustrating a system architecture, according to some embodiments.

FIG. 1 is a schematic diagram illustrating a system architecture, according to some embodiments.

As shown in FIG. 1, embodiments of an information sharing method provided in the present specification can include roles in FIG. 1. A first institution can directly receive user information, so as to complete certain processing work based on the user information, such as the previously-mentioned reviewing suspicious transactions. In addition, the first institution can externally provide a result of reviewing a suspicious transaction, that is, an STR crime label, or externally provide the STR crime label. Both the first institution and a second institution can be connected to a blockchain, and can be connected to a privacy computing platform. By using the privacy computing platform, predetermined rules can be executed in a trusted security computing environment, thereby completing AML risk information sharing such as STR crime labels.

The following describes the information sharing method embodiments of the present specification with reference to the previously-mentioned examples of AML risk information sharing. That the risk information is specifically an STR crime label is used as an example. The first institution and the second institution can respectively label an STR crime label to a user based on anti-money laundering audit capabilities of the first institution and the second institution. The anti-money laundering capabilities of the first institution and the second institution may be different, and the content and quality of user information and historical transactions may also be different. In this case, the first institution and the second institution may respectively label different STR crime labels to user A. For example, the STR crime label labeled by the first institution to user A is [drug crime, organized crime of a gangdom], and the STR crime label labeled by the second institution to user A is [smuggling crime]. To obtain more accurate STR crime labels, the STR crime labels of the same user can be shared between the first institution and the second institution. That risk information is specifically a money-laundering risk level is used as an example. The first institution and the second institution can respectively label money-laundering risk levels to a user based on the anti-money laundering audit capabilities of the first institution and the second institution. Similarly, the first institution and the second institution respectively label different money-laundering risk levels to user A. For example, the money-laundering risk level label labeled by the first institution to user A is [high risk level], and the money-laundering risk level label labeled by the second institution to user A is [medium risk level]. To obtain a more accurate money-laundering risk level, the first institution and the second institution can share money-laundering risk level labels of the same user.

Figure 2:
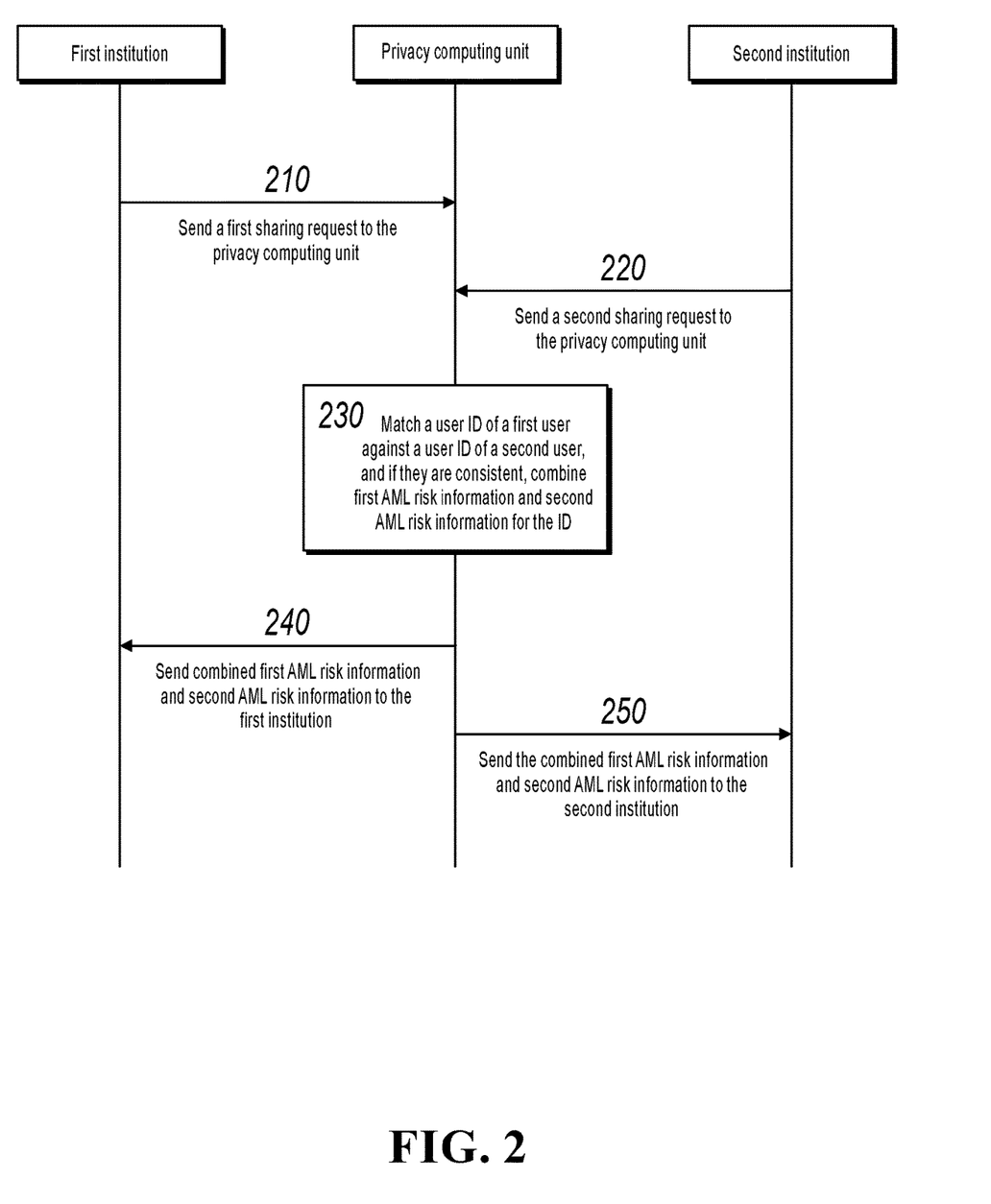
FIG. 2 is a flowchart illustrating embodiments of an information sharing method, according to the present specification.

With reference to FIG. 1, an information sharing method provided in the present specification is specifically implemented as follows:

FIG. 2 is a flowchart illustrating embodiments of an information sharing method, according to the present specification.

As shown in FIG. 2, the method can include the following steps.

Step 210: A first institution sends a first sharing request to a privacy computing unit, where the first sharing request includes a user ID of a first user and corresponding first AML risk information.

The first institution can be a financial institution, and a user can initiate a transaction through the financial institution, such as money transfer, remittance, or purchasing a financial product issued by the first institution. The first user can be an individual user, an enterprise user, etc. The first institution can perform anti-money laundering review on the first user. For example, the first institution can obtain an STR crime label or a money-laundering risk level label of the first user based on information such as basic data of the first user and historical transactions. For an individual user, the basic data can include a part or all of information such as name, gender, nationality, certificate type, certificate number, age, occupation, mobile phone number, contact address, etc. of the individual. For an enterprise user, the basic data can include a part or all of information such as name, business license number, business place address, name of legal representative, certificate type, certificate number, validity period, etc. of the enterprise.

The user ID can be an account registered by the user at the first institution, or an account allocated to the user by a system of the first institution when the first user initiates an operation (such as initiating money transfer or purchasing a financial product) at the first institution. Such an account can be, for example, a character string. The user ID should specifically identify a user. The corresponding field is information of the individual user or the enterprise user as described above.

For an individual user, if an identity card is uniformly used as the certificate type, the user ID of the first user can also be an identity card number. However, the identity card number is actually also personal privacy data. Therefore, considering that personal privacy data should not be disclosed, hash processing can be performed on the identity card number. Because hash calculation has a unidirectional feature and a feature of hiding original information, and a good hash function has an anti-collision capability, that is, there is a very high probability that hash values obtained by different inputs are also different, a hash calculation result (or referred to as a digest value) can be used as a user ID. This is also the case for the mobile phone number.

Similarly, hash calculation can be performed after a group of data of a user is concatenated in order, and a digest value obtained is used as the user ID of the first user, for example, a digest value obtained by hash(name+certificate type+certificate number) is used as a user ID, where "+" can represent sequential concatenation of characters beforehand and afterward. Anti-money laundering generally has a relatively high requirement for data security. To further strengthen data security protection, a salting operation can also be performed in hash calculation, for example, hash (name+certificate type+certificate number+salt), where salt is a value generated based on a predetermined rule.

The first institution can prompt the user to provide the basic data when the first user registers, or can request the first user to provide the basic data when the first user initiates an operation at the first institution platform.

As described above, AML risk information of the first user is, for example, an STR crime label [drug crime] [organized crime of a gangdom] labeled by the first institution to the first user, or a money-laundering risk level label [high risk level] labeled by the first institution to the first user. The user ID of the first user corresponds to the AML risk information of the first user.

The first institution can send the user ID of the first user and the AML risk information of the first user to the privacy computing unit. The AML risk information of the first user can be encrypted, thereby ensuring security in a data transmission process. Similarly, the user ID of the first user can be encrypted, especially in a case that an identity card number or a mobile phone number is used as the user ID of the first user. In addition, the first institution can sign content sent to the privacy computing unit by using a private key of the first institution. After verifying a signature by using a public key of the first institution, a recipient can acknowledge that the information is sent by the first institution, and the content is complete and is not tampered with.

That the first institution sends the first sharing request to the privacy computing unit can be specifically that the first institution sends the first sharing request to the privacy computing unit in a method of initiating a transaction for invoking a contract.

The blockchain technology supports the user to create and invoke some complex logic in the blockchain network since Ethereum, which is one of the biggest advances of Ethereum compared with the bitcoin technology. An Ethereum virtual machine (EVM) is the core of Ethereum, which is a programmable blockchain, and each Ethereum node can run the EVM. The EVM is a Turing-complete virtual machine, through which various complex logics can be implemented. A user can deploy and invoke a smart contract by using the EVM in Ethereum. In the deployment phase, the user can send a transaction for creating a smart contract to Ethereum. The data field of the transaction can include a code (such as a bytecode) of the smart contract. The to field of the transaction is null. After diffusion and consensus of the transaction, each node in the Ethereum network can execute the transaction by using the EVM, and generate a corresponding contract instance, so as to complete deployment of the smart contract. In this case, the blockchain can have a contract account corresponding to the smart contract, and the contract account has a specific contract address. In the invoking phase, a user (which can be the same or different from the user deploying the smart contract) sends a transaction used to invoke a smart contract to the Ethereum network, where the from field of the transaction is an address of an external account corresponding to the user, the to field is a contract address of the smart contract that needs to be invoked, and the data field includes a method and a parameter for invoking the smart contract. After consensus is reached between the nodes by using the consensus mechanism, the smart contract invoked as declared by the above transaction is independently executed on each node of the Ethereum network in a specified method, and all execution records and data are stored in the blockchain. Therefore, after the transaction is completed, transaction records that cannot be tampered with and will not be lost are stored in the blockchain. With development of blockchain technologies, in addition to the EVM, many other types of virtual machines, such as WebAssembly (WASM) virtual machines, are generated.

Each blockchain node can create and invoke a smart contract by using a virtual machine. It is a challenge for privacy protection to store transactions that include smart contracts and execution results of transactions in a blockchain ledger, or to store all ledgers on each full node in the blockchain. Privacy protection can be implemented by using a plurality of technologies, such as cryptography technologies (such as homomorphic encryption or zero-knowledge proof), hardware privacy technologies, and network isolation technologies. The hardware privacy protection technologies typically includes a trusted execution environment (TEE).

For example, the blockchain nodes can implement a secure execution environment for blockchain transactions by using the TEE. The TEE is a trusted execution environment that is based on a secure extension of CPU hardware and fully isolated from the outside. Currently, the industry attaches great importance to the TEE solution. Almost all mainstream chips and software alliances have their own TEE solutions, such as a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be peeped even at an operating system level, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process is hardly lost. Therefore, by deploying the TEE environment on the blockchain node, privacy requirements in the blockchain scenario can be met to a great extent while a performance loss is relatively small.

Intel SGX (SGX for short) technology is used as an example. The blockchain node can create an enclave based on the SGX technology as a TEE for executing a blockchain transaction. The blockchain node can allocate a part of enclave page cache in a memory by using a processor instruction newly added to a CPU, so as to retain the previously-mentioned enclave. A memory area corresponding to the previously-mentioned EPC is encrypted by a memory encryption engine (MEE) in the CPU, content (codes and data in the enclave) in the memory area can be decrypted only in the CPU core, and keys used for encryption and decryption are generated and stored in the CPU only when the EPC starts. It can be understood that a security boundary of the enclave includes only itself and the CPU, neither privileged nor unprivileged software can access the enclave, and even an operating system administrator and a virtual machine monitor (VMM, or referred to as a hypervisor) is unable to affect the codes and data in the enclave. Therefore, the enclave has very high security. In addition, with the previously-mentioned security guarantee, the CPU can process a blockchain transaction in a plaintext form in the enclave, and has very high operation efficiency, so both data security and calculation efficiency are ensured. However, data that enters or exits the TEE can be encrypted, so as to ensure data privacy.

In the embodiments of the present specification, the blockchain node can receive the first sharing request sent by the first institution. Specifically, the first sharing request can be received by a privacy computing unit in the blockchain node. As described above, the privacy computing unit in the blockchain node can be, for example, a TEE created by the blockchain node based on the SGX technology, so as to be used for executing the blockchain transaction in a trusted and secret way. A virtual machine can be run in the TEE, so a contract is executed by using the virtual machine. As such, for an encrypted transaction for invoking a contract that is sent to the privacy computing unit of the blockchain node, the privacy computing unit can decrypt and execute the encrypted transaction in the virtual machine loaded in the privacy computing unit, and can encrypt and output an execution result. The remote attestation technology in SGX can prove that it is legitimate SGX, and programs executed therein (e.g., virtual machine codes) are consistent with expectations. The invoked contract, as described above, can be deployed on the blockchain in advance. The deployed contract, through codes therein, can initiate an access request to data outside the blockchain during execution, or can send an execution result to another physical or logical entity outside the blockchain after execution ends. Specifically, as described below, the execution result of the smart contract can be transmitted by the TEE in the blockchain node to the first institution and the second institution by using the oracle mechanism.

Each blockchain node creates and invokes a smart contract by using a virtual machine, which consumes relatively more resources. Relative to using the TEE technology to protect privacy on each node in the blockchain network, a privacy computing node (that is, an off-chain privacy computing node, also referred to as a "privacy computing unit" in the embodiments of the present disclosure) can be deployed outside the blockchain network (or referred to as "off-chain"), so computing operations that originally need to be performed on all the blockchain nodes are transferred to the off-chain privacy computing node for execution. Based on a verifiable computation technology, it can be proven that the previously-mentioned computing results are actually performed as expected in the TEE, thereby ensuring reliability while reducing on-chain resource consumption.

An off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process.

Before being used, the privacy computing node can prove to a user that the privacy computing node is trustworthy. The process of proving trustworthy of the privacy computing node may involve a remote attestation report. The processes that the on-chain and off-chain privacy computing nodes prove themselves trustworthy are similar. Using the off-chain privacy computing node as an example, a remote attestation report is generated in a remote attestation process for the off-chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy.

For example, before sending the first sharing request to the off-chain privacy computing unit, the first institution can first verify whether the off-chain privacy computing unit is trustworthy. Specifically, the first institution can challenge the off-chain privacy computing node, and receive the remote attestation report returned by the off-chain privacy computing node. For example, the first institution can initiate an off-chain challenge to the off-chain privacy computing node, that is, the process of initiating the challenge can be independent of the blockchain network, so a consensus process between the blockchain nodes can be skipped and on-chain and off-chain interoperability can be reduced. Therefore, the challenge of the first institution to the off-chain privacy computing node has higher operational efficiency. For another example, the financial institution can use an on-chain challenge, for example, the financial institution can submit a challenge transaction to the blockchain node. Challenge information contained in the challenge transaction can be transmitted by the blockchain node to the off-chain privacy computing node by using the oracle mechanism, and the challenge information is used to challenge the off-chain privacy computing node. Regardless of the previously-mentioned on-chain challenge or the off-chain challenge, after obtaining the remote attestation report, a challenger (such as the financial institution) can verify a signature of the remote attestation report based on a public key of the authoritative authentication server, and if the verification succeeds, can acknowledge that the off-chain privacy computing node is trustworthy.

The off-chain privacy computing platform can store a pair of public and private keys in the TEE. The public key can be sent to the counterpart in a process such as a remote attestation process, and the private key is properly stored in the TEE. When it is determined, based on the remote attestation report, that the off-chain privacy computing node is trustworthy, the financial institution can encrypt and transmit a bytecode of the off-chain contract to the off-chain privacy computing node, and the off-chain privacy computing node obtains the bytecode through decryption in the off-chain trusted execution environment and deploys the bytecode. The previously-mentioned encryption can use the public key. In the previously-mentioned process, after a contract is deployed on the off-chain privacy computing node, the contract can be stored, and a hash value of the contract is calculated. The hash value of the contract can be fed back to the deployer of the contract. The deployer can locally generate a hash value for the deployed contract. Therefore, the deployer can compare whether a hash value of the deployed contract is the same as the local contract hash value. If they are the same, it indicates that the contract deployed on the off-chain privacy computing node is a contract deployed by the deployer. Content sent from the off-chain privacy computing node can be signed by using a private key stored in the TEE, so as to prove that the content is a result of execution by the TEE. Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, or if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is also similar, and can also have an identity, that is, have a pair of public and private keys.

Subsequently, the off-chain privacy computing node can invoke the deployed off-chain contract. Specifically, when the deployed off-chain contract is invoked, a bytecode of the deployed contract can be loaded and executed in the off-chain trusted execution environment, and an execution result can be fed back to an invoker of the contract, or fed back to a recipient specified in the contract or a recipient specified in a transaction for invoking the contract, or fed back to the blockchain node by using the oracle mechanism. The execution result fed back to the blockchain node by using the oracle mechanism can be further fed back to the recipient specified in the on-chain contract or to the recipient specified in the transaction for invoking the on-chain contract via the setting of the on-chain contract.

In addition, the execution result of the off-chain privacy computing node can be output after being encrypted by using a key. For example, in an asymmetric encryption method, a public key used for encryption can be a public key in a pair of public and private keys negotiated in the previously-mentioned challenge process, or can be sent by a challenger to the off-chain privacy computing node after being generated by using the DIS service. The challenger here can be the first institution in the embodiments of the present specification. Therefore, in the previously-mentioned method, it can be ensured that all data entering or exiting the off-chain privacy computing node is encrypted, so as to ensure security in a data transmission process. Similarly, data entering the off-chain privacy computing node can be signed by a sender by using a key of the sender, so as to prove, by using a signature verification process, that the data is sent by the sender, and content is complete and is not tampered with. The principles in the subsequent similar steps are the same.

Similarly, an identity can be created for the previously-mentioned challenger or the first institution by combining the DIS with the blockchain. A blockchain can provide a decentralized (or weakly centralized), non-tampering (or difficult to tamper with), trusted distributed ledger, and can provide a secure, stable, transparent, auditable, and efficient method of recording transactions and data information interaction. A blockchain network can include a plurality of nodes. Generally, one or more nodes of the blockchain belong to one participant. Generally, the more participants in a blockchain network, the more authoritative the participants are, the more trustworthy the blockchain network is. Here, a blockchain network formed by a plurality of participants is referred to as a blockchain platform. The blockchain platform can help the first institution to verify the identity.

In order to use the distributed digital identity service provided by the blockchain platform, the first institution can register its identity in the blockchain platform. For example, the first institution can create a pair of public and private keys, secretly store the private key, and can create a distributed digital identity (also referred to as a decentralized identifier, DID). The first institution can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross-institution identity authentication and data cooperation. The DIS system can be connected to the blockchain platform. A DID can be created for the first institution by using the DIS system, the DID and the public key are sent to the blockchain platform for storage, and the created DID is further returned to the first institution. The public key can be included in DIDdoc, which can be stored in the blockchain platform. The DIS can create the DID for the first institution based on the public key sent by the first institution. For example, the DID is created after the public key of the first institution is calculated by using the hash function, or can be created based on other information of the first institution (which can include the public key or not include the public key). The latter case may need the first institution to provide information other than the public key. Afterward, the first institution can provide a verification function to prove to other parties that it is the first institution. For a specific example, references can be made to FIG. 3 for description.

Figure 3:
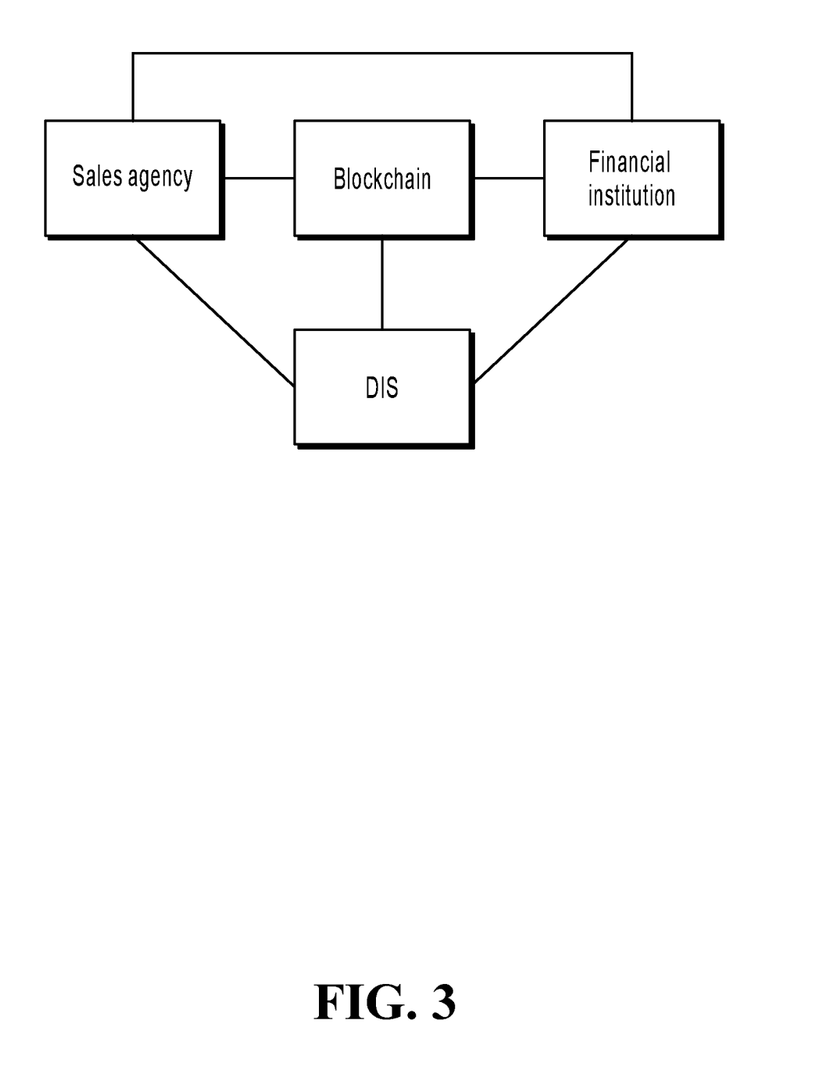
FIG. 3 is an architectural diagram of providing a verification function by using a decentralized identity service (DIS) and a blockchain, according to some embodiments of the present specification.

FIG. 3 is an architectural diagram of providing a verification function by using a DIS and a blockchain, according to some embodiments of the present specification, which can specifically include a role in FIG. 3.

Figure 4:
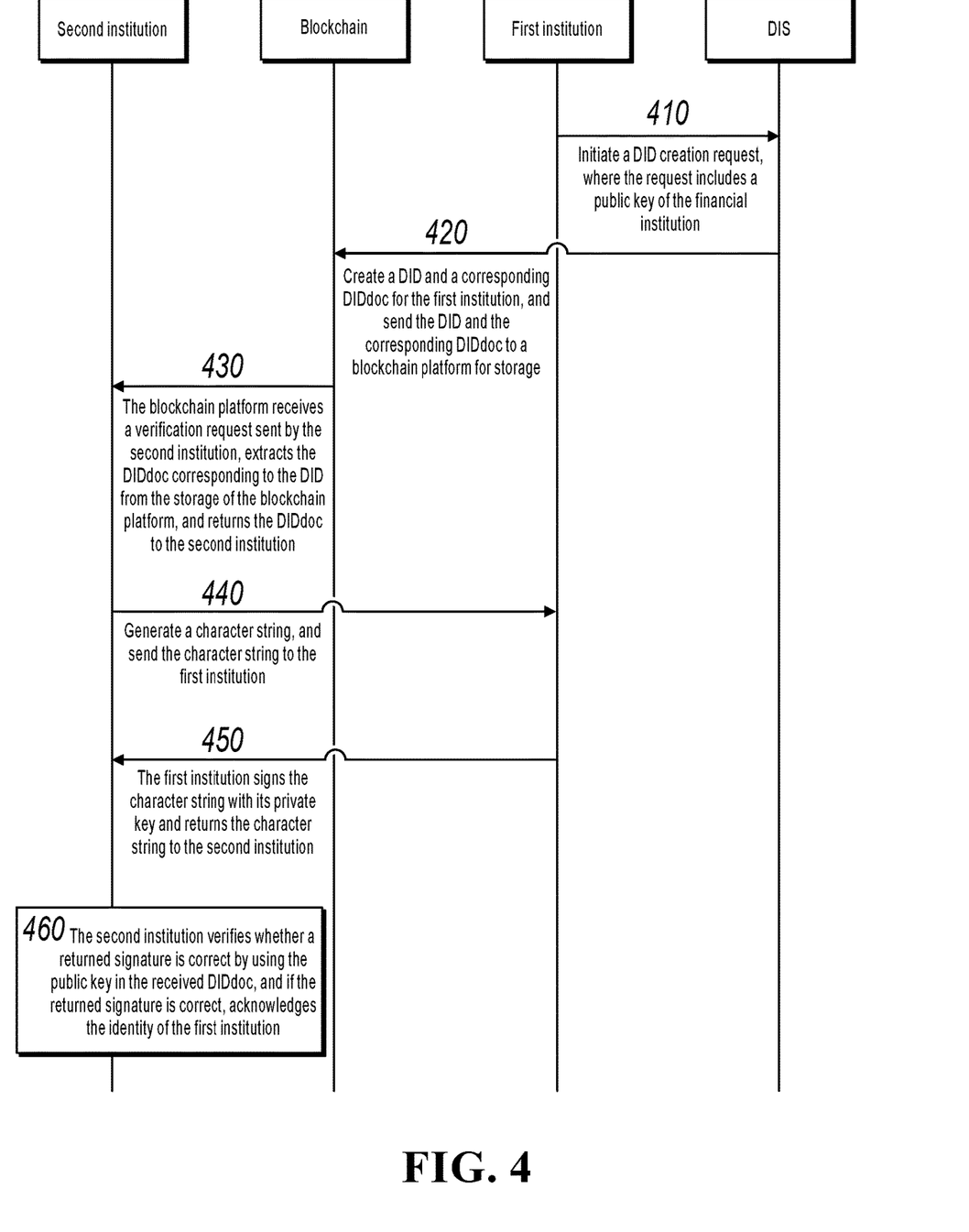
FIG. 4 is a flowchart of providing a verification function by using a DIS and a blockchain, according to some embodiments of the present specification.

For a specific verification step by using the architecture in FIG. 3, references can be made to FIG. 4 for description.

FIG. 4 is a flowchart of providing a verification function by using a DIS and a blockchain, according to some embodiments of the present specification.

As shown in FIG. 4, the method can include the following steps.

Step 410: A first institution initiates a DID creation request to a DIS, where the request includes a public key of the first institution.

Step 420: In response to the creation request, the DIS creates a DID and a corresponding DIDdoc for the first institution, and sends the DID and the corresponding DIDdoc to a blockchain platform for storage, where the DIDdoc includes the public key of the first institution.

Step 430: The blockchain platform receives a verification request sent by a second institution, where the verification request includes the DID of the first institution; and the blockchain platform extracts the DIDdoc corresponding to the DID from the storage of the blockchain platform, and returns the DIDdoc to the second institution.

Step 440: The second institution generates a character string and sends the character string to the first institution.

Step 450: The first institution signs the character string with its private key and returns the character string to the second institution.

Step 460: The second institution verifies whether a returned signature is correct by using the public key in the previously received DIDdoc, and if the returned signature is correct, acknowledges the identity of the first institution.

A smart contract deployed on the privacy computing unit can receive the first sharing request sent by the first institution, and in addition to the user ID of the first user and the corresponding first AML risk information, the first sharing request can further include the DID of the first institution. The first sharing request sent by the first institution can be signed by the first institution by using a private key of the first institution. Correspondingly, after receiving the sharing request, the privacy computing unit can verify the signature by using the public key of the first institution.

Step 220: The second institution sends a second sharing request to the privacy computing unit, where the second sharing request includes a user ID of a second user and corresponding second AML risk information.

Step 220 is similar to step 210, and details are not described. In addition, there is no obvious sequence requirement between step 210 and step 220.

It is worthwhile to note that, in a case that the user ID is an account registered by the user at the institution, accounts registered by the same user at different institutions are the same. In a case that the user ID is an account allocated to the user by the system of the institution when the user initiates an operation at the institution, the account allocated to the same user by the system of the first institution and the account allocated to the same user by the system of the second institution are the same. As such, matching based on the user ID in step 230 can be ensured.

In a case that the user ID includes a digest value obtained through hash calculation on one or more pieces of information of the user, the ID of the user in the first institution and the ID of the user in the second institution should use the same hash function and input, thereby ensuring that the ID of the same user in the first institution and the ID of the same user in the second institution are the same.

For a salting operation, the first institution and the second institution can use the same salt through negotiation in advance.

Step 230: The privacy computing unit matches the user ID of the first user against the user ID of the second user, and if they are consistent, combines the first AML risk information and the second AML risk information for the user ID.

Through previously-mentioned steps 210 and 220, the privacy computing unit respectively receives the first sharing request and the second sharing request from the first institution and the second institution. The first sharing request includes the user ID of the first user and corresponding first AML risk information, and the second sharing request includes the second user ID and the corresponding second AML risk information. For example, the first sharing request includes {user ID of the first user: STR crime label of the first user [drug crime] [organized crime of a gangdom]}, and the second sharing request includes {user ID of the second user: STR crime label of the second user [smuggling crime]}. For a case that information in an incoming sharing request is encrypted, a plaintext can be obtained through decryption first.

Further, the privacy computing unit can match the user ID of the first user against the user ID of the second user in different sharing requests, and if the user ID of the first user is consistent with the user ID of the second user, combine the first AML risk information and the second AML risk information for the ID. In the previous example, if the user ID of the first user in the first sharing request matches the user ID of the second user in the second sharing request, for example, is fully consistent, the privacy computing unit can combine the first AML risk information and the second AML risk information. A combination result is, for example, {user ID of the first user/user ID of the second user: STR crime labels of the first user/second user [drug crime] [organized crime of a gangdom] [smuggling crime] }.

As described above, the first sharing request can further include a DID of the first institution. Similarly, the second sharing request can further include a DID of the second institution. Further, the privacy computing unit can match user IDs in sharing requests from different institutions, and if they are consistent, combine AML risk information for the ID. For example, the first sharing request includes {DID of the first institution: user ID of the first user: STR crime label of the first user [drug crime] [organized crime of a gangdom]}, and the second sharing request includes {DID of the second institution: user ID of the second user: STR crime label of the second user [smuggling crime] }. In the previous example, if the user ID of the first user in the first sharing request matches the user ID of the second user in the second sharing request, for example, is fully consistent, the privacy computing unit can combine the first AML risk information and the second AML risk information. A combination result is, for example, {DID of the first institution; DID of the second institution: user ID of the first user/user ID of the second user: STR crime labels of the first user/ second user [drug crime] [organized crime of a gangdom] [smuggling crime]}.

As described above, the privacy computing unit can be deployed with a smart contract, used to: receive the data sharing requests sent by at least two institutions, in response to the requests, match the user ID of the first user in the first sharing request sent by the first institution against the user ID of the second user in the second sharing request sent by the second institution, and if the user ID of the first user is consistent with the user ID of the second user, combine the first AML risk information in the first sharing request and the second AML risk information in the first sharing request for the ID; and further used to send combined first AML risk information and second AML risk information to the first institution and the second institution. As such, step 230 and subsequent step 240 can be implemented by using the deployed smart contract.

Step 240: The privacy computing unit sends the combined first AML risk information and second AML risk information to the first institution.

Step 250: The privacy computing unit sends the combined first AML risk information and second AML risk information to the second institution.

Through step 230, the privacy computing unit sends the combined first AML risk information and second AML risk information to the first institution and the second institution, that is, feeds back the combined AML risk information to the institutions that provide the AML risk information. Further, if either one of the first institution and the second institution provides only the user ID, but does not provide any risk label, in the step of matching the user ID of the first user against the user ID of the second user, the privacy computing unit can first check whether the corresponding sharing request includes AML risk information, and match the user ID of the first user against the user ID of the second user after acknowledging that the sharing request includes the AML risk information. Further, the privacy computing unit can further check whether the existing AML risk information satisfies a predefined rule, for example, satisfies a specific label of the STR crime label. As such, after acknowledging that the AML risk information in the sharing request satisfies the predefined rule, the privacy computing unit matches the user ID of the first user against the user ID of the second user. If no AML risk information is included, or included AML risk information does not satisfy the predefined rule, matching may not be performed, that is, the existing AML risk information is prevented from being shared with an institution that does not provide any AML risk information or provides incorrect AML risk information.

The privacy computing unit can respectively send the combined first AML risk information and second AML risk information to the first institution and the second institution respectively based on the matched and consistent DID of the first institution and DID of the second institution. The sent information can be encrypted by using a public key of a recipient, so the recipient can decrypt the received information by using a corresponding private key. Before sending the combined first AML risk information and second AML risk information to the first institution, the privacy computing unit can further first verify an identity of the first institution. For example, a process of using the previously-mentioned steps 410 to 460 is not described again. Similarly, before sending the combined first AML risk information and second AML risk information to the second institution, the privacy computing unit can further first verify an identity of the second institution. In addition, the privacy computing unit can send the combined first AML risk information and second AML risk information to the first institution and the second institution respectively based on the matched and consistent DID of the first institution and the DID of the second institution, and the sent information can be signed by using a private key of the privacy computing unit.

In addition, the privacy computing unit can further send a proof of the combination result to the blockchain. The proof of the combination result can include a verifiable claim (VC) signed by the privacy computing unit. The VC is also an important application in the DID. The VC can be stored on the blockchain platform. For example, content of the VC can include a hash value of a combination result corresponding to a user ID, and the hash value is signed by the privacy computing unit. After a process similar to step 410 to step 460, the privacy computing unit can store its DIDdoc on the blockchain.

When verifying the AML risk information of the institution to the user, a regulatory organization can verify the corresponding VC through the blockchain in addition to obtaining the matching result from the institution. Specifically, when obtaining the public key in the DIDdoc of the privacy computing unit from the blockchain, and verifying the combination result of the institution, the regulatory organization can further verify the signature of the VC by using the public key of the privacy computing unit, so as to acknowledge that the VC is issued by the privacy computing unit and is complete, that is, the VC is not tampered with, and the hash value is corresponding to the combination result. As such, authenticity acknowledgement of the KYC verification result provided by the financial institution can be improved based on a non-tampering feature of the blockchain platform and trustworthiness of a signing institution. The trustworthiness of the signing institution, that is, the trustworthiness of the privacy computing unit/second smart contract, can be implemented by auditing the identity of the privacy computing unit and the contract code deployed therein. The identity of the privacy computing unit is audited, for example, the previously-mentioned challenge initiation process can verify that the identity of the privacy computing unit is trustworthy.

As such, by using the solutions in the previously-mentioned embodiments, an anti-money laundering obligatory institution can have more AML risk results, thereby improving a more accurate anti-money laundering audit capability of the anti-money laundering obligatory institution, and improving an overall anti-money laundering audit capability of the industry.

The following describes embodiments of an information sharing system of the present specification, including:

a first institution, configured to send a first sharing request to a privacy computing unit, where the first sharing request includes a user ID of a first user and corresponding first AML risk information;

a second institution, configured to send a second sharing request to the privacy computing unit, where the second sharing request includes a user ID of a second user and corresponding second AML risk information; and the privacy computing unit, configured to: match the user ID of the first user against the user ID of the second user, and if they are consistent, combine the first AML risk information and the second AML risk information for the ID; and send the combined first AML risk information and second AML risk information to the first institution and the second institution.

The user ID can include:

an account registered by the user at the institution; or an account allocated to the user by a system of the institution when the user initiates an operation at the institution.

The user ID can include:

a digest value obtained through hash calculation on one or more pieces of information of the user.

The user ID can include a digest value obtained through salting hash calculation on one or more pieces of information of the user.

The sent user ID can be encrypted.

The sent AML risk information can be encrypted.

The sending a sharing request to a privacy computing unit can include:

sending the sharing request to the privacy computing unit in a method of initiating a transaction for invoking a contract.

The sending the sharing request to the privacy computing unit in a method of initiating a transaction for invoking a contract can include:

sending the sharing request to a privacy computing unit on a blockchain in a method of initiating a transaction for invoking a contract; or sending the sharing request to a privacy computing unit off a blockchain in a method of initiating a transaction for invoking a contract.

The sharing request sent to the privacy computing unit includes a signature of a sender; and the sender is the first institution or the second institution.

The privacy computing unit is deployed with a smart contract, used to: receive the data sharing requests sent by at least two institutions, in response to the requests, match the user ID of the first user in the first sharing request sent by the first institution against the user ID of the second user in the second sharing request sent by the second institution, and if the user ID of the first user is consistent with the user ID of the second user, combine the first AML risk information in the first sharing request and the second AML risk information in the first sharing request for the ID; and further used to send combined first AML risk information and second AML risk information to the first institution and the second institution.

Before sending the combined first AML risk information and second AML risk information to the first institution and the second institution, the privacy computing unit further verifies an identity of the first institution and an identity of the second institution.

The method can further include:

The privacy computing unit sends a proof of the combination result to the blockchain.

The proof of the combination result includes a verifiable claim signed by the privacy computing unit.

When verifying the combination result of the first institution/the second institution, a regulatory organization further verifies a signature of the verifiable claim by using a public key of the privacy computing unit.

The first sharing request sent by the first institution further includes a DID of the first institution, and the second sharing request sent by the second institution further includes a DID of the second institution.

That the privacy computing unit sends the combined first AML risk information and second AML risk information to the first institution and the second institution can include:

The privacy computing unit sends the combined first AML risk information and second AML risk information to the first institution and the second institution respectively based on the matched and consistent DID of the first institution and the DID of the second institution.

Before the privacy computing unit matches the user ID of the first user against the user ID of the second user, the method further includes:

acknowledging that a corresponding sharing request includes AML risk information.

The acknowledging that a corresponding sharing request includes AML risk information can further include:

acknowledging that existing AML risk information satisfies a predefined rule.

The system can further include:

If no AML risk information is included, or included AML risk information does not satisfy the predefined rule, no matching is performed, that is, the existing AML risk information is prevented from being shared with an institution that does not provide any AML risk information or provides incorrect AML risk information.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the previously-mentioned several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously-mentioned embodiments can be implemented by using a computer chip or an entity, or can be implemented by using a product having a certain function. A typical implementation device is a server system. Certainly, with development of computer technologies in the future, a computer that implements a function of the previously-mentioned embodiments can be, a personal computer, a laptop computer, a cellular phone, a camera phone, a smartphone, a personal digital assistant, a media player, a navigation device, an email device, a game console, a tablet computer, or a wearable device, or a combination of any of these devices.

Although the one or more embodiments of the present specification provide the operation steps of the method according to embodiments or flowcharts, the conventional or non-creative means can include more or fewer operation steps. A sequence of the steps listed in the embodiments is merely one of numerous execution sequences of the steps, and does not represent a unique execution sequence. In actual execution of an apparatus or a terminal product, execution can be performed based on a method sequence shown in the embodiments or the accompanying drawings, or performed in parallel (for example, a parallel processor or a multi-thread processing environment, or even a distributed data processing environment). Terms "include", "contain", or their any other variants are intended to cover non-exclusive inclusion, so a process, a method, a product, or a device that includes a series of elements not only includes these very elements, but also includes other elements inherent are not expressly listed, or further includes elements inherent to such process, method, product, or device. An element preceded by "includes a . . . " does not, without more constraints, preclude the existence of additional identical elements in the process, method, product, or device that includes the element. For example, the words such as "first" and "second" are used to indicate names instead of any particular order.

For ease of description, the previously-mentioned apparatuses are described by dividing the functions into various modules. Certainly, when the one or more embodiments of the present specification are implemented, the functions of each module can be implemented in one or more pieces of software and/or hardware, or a module implementing a same function can be implemented by a combination of a plurality of submodules or subunits. The described apparatus embodiments are merely examples. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present specification is described with reference to the flowcharts and/or block diagrams of the method, the apparatus (system), and the computer program product according to the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device Based on the definition in the present specification, the computer readable medium does not include transitory media such as a modulated data signal and carrier.

A person skilled in the art should understand that the one or more embodiments of the present specification can be provided as a method, a system, or a computer program product. Therefore, one or more embodiments of the present specification can use a form of hardware only embodiments, software only embodiment, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

One or more embodiments of the present specification can be described in the general context of computer-executable instructions, for example, a program module. Generally, the program module includes a routine, a program, an object, a component, a data structure, etc. executing a specific task or implementing a specific abstract data type. The one or more embodiments of the present specification can also be practiced in distributed computing environments. In these distributed computing environments, tasks are executed by remote processing devices that are connected by using a communications network. In a distributed computing environment, the program module can be located in both local and remote computer storage media including storage devices.

The embodiments in the present specification are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment. In descriptions in the present specification, descriptions about such reference terms as "an embodiment", "some embodiments", "an example", "a specific example", and "some examples" mean that specific features, structures, materials, or characteristics described with reference to the embodiments or examples are included in at least one embodiment or example of the present specification. In the present specification, the previously-mentioned examples of the terms are not necessarily with respect to the same embodiment or example. In addition, the described specific features, structures, materials, or characteristics can be combined in a proper way in any one or more of the embodiments or examples. In addition, a person skilled in the art can integrate or combine different embodiments or examples and characteristics of different embodiments or examples described in the present specification, provided that they do not conflict with each other.

The previously-mentioned descriptions are merely embodiments of the one or more embodiments of the present specification, and are not intended to limit the one or more embodiments of the present specification. For a person skilled in the art, the one or more embodiments of the present specification can have various modifications and changes. Any modification, equivalent replacement, or improvement made without departing from the spirit and principle of the present specification shall fall within the scope of the claims.

What is claimed is:
1. A computer-implemented method, comprising:
receiving, by a trusted execution environment (TEE), a first sharing request from a first institution, wherein the first sharing request comprises a user identifier of a first user and first anti-money laundering (AML) risk information of the first user, and wherein the user identifier of the first user comprises a first digest value obtained through performing a hash calculation on one or more pieces of information of the first user;
receiving, by the TEE, a second sharing request from a second institution, wherein the second sharing request comprises a user identifier of a second user and second AML risk information of the second user, and wherein the user identifier of the second user comprises a second digest value obtained through performing the hash calculation on one or more pieces of information of the second user, the second institution being different from the first institution;
determining, by the TEE, that the first sharing request comprises at least one first risk label and that the second sharing request comprises at least one second risk label, each of the at least one first risk label and the at least one second risk label comprising at least one of a corresponding suspicious transaction report (STR) crime label or a corresponding money-laundering risk level label, the at least one first risk label being labeled by the first institution to the first user based on at least one of basic data of the first user or historical transactions of the first user, the at least one second risk label being labeled by the second institution to the second user based on at least one of basic data of the second user or historical transactions of the second user;
determining, by the TEE, that the first sharing request comprises the first AML risk information and the second sharing request comprises the second AML risk information based on the at least one first risk label and the at least one second risk label, the first AML risk information corresponding to the user identifier of the first user and comprising information associated with the at least one first risk label, the second AML risk information corresponding to the user identifier of the second user and comprising information associated with the at least one second risk label;
in response to determining that the first sharing request comprises the first AML, risk information and the second sharing request comprises the second AML risk information, determining, by the TEE, whether the user identifier of the first user matches the user identifier of the second user based on the first digest value and the second digest value;

in response to that the user identifier of the first user matches the user identifier of the second user, combining, by the TEE in plaintext form, the first AML risk information and the second AML risk information for the user identifier, as a combined first AML risk information and second AML risk information;

sending, by the TEE, a combination result that comprises the combined first AML risk information and second AML risk information to each of the first institution and the second institution by using an oracle mechanism; and sending, by the TEE, a proof of the combination result to a blockchain network, wherein the proof comprises a verifiable claim comprising a signature of the TEE and a third digest value obtained through performing a hash calculation on the combination result.

2. The computer-implemented method of claim 1, wherein the user identifier of the first user comprises an account registered by the first user at the first institution or assigned to the first user by the first institution in response to an operation initiated by the first user at the first institution, and wherein the user identifier of the second user comprises an account registered by the second user at the second institution or assigned to the second user by the first institution in response to an operation initiated by the second user at the first institution.

3. The computer-implemented method of claim 1, wherein the first sharing request comprises a signature of the first institution, and the second sharing request comprises a signature of the second institution.

4. The computer-implemented method of claim 1, wherein the TEE is deployed with a smart contract, wherein the smart contract is configured to receive at least two sharing requests from at least two institutions.

5. The computer-implemented method of claim 1, comprising:
verifying, by the TEE, an identity of the first institution and an identity of the second institution.

6. A non-transitory, computer-readable medium storing one or more instructions executable by a computer system to perform operations comprising:

receiving, by a trusted execution environment (TEE), a first sharing request from a first institution, wherein the first sharing request comprises a user identifier of a first user and first anti-money laundering (AML) risk information of the first user, and wherein the user identifier of the first user comprises a first digest value obtained through performing a hash calculation on one or more pieces of information of the first user;

receiving, by the TEE, a second sharing request from a second institution, wherein the second sharing request comprises a user identifier of a second user and second AML risk information of the second user, and wherein the user identifier of the second user comprises a second digest value obtained through performing the hash calculation on one or more pieces of information of the second user, the second institution being different from the first institution;

determining, by the TEE, that the first sharing request comprises at least one first risk label and that the second sharing request comprises at least one second risk label, each of the at least one first risk label and the at least one second risk label comprising at least one of a corresponding suspicious transaction report (STR) crime label or a corresponding money-laundering risk level label, the at least one first risk label being labeled by the first institution to the first user based on at least one of basic data of the first user or historical transactions of the first user, the at least one second risk label being labeled by the second institution to the second user based on at least one of basic data of the second user or historical transactions of the second user;

determining, by the TEE, that the first sharing request comprises the first AML, risk information and the second sharing request comprises the second AML risk information based on the at least one first risk label and the at least one second risk label, the first AML risk information corresponding to the user identifier of the first user and comprising information associated with the at least one first risk label, the second AML risk information corresponding to the user identifier of the second user and comprising information associated with the at least one second risk label;

in response to determining that the first sharing request comprises the first AML risk information and the second sharing request comprises the second AML risk information, determining, by the TEE, whether the user identifier of the first user matches the user identifier of the second user based on the first digest value and the second digest value;

in response to that the user identifier of the first user matches the user identifier of the second user, combining, by the TEE in plaintext form, the first AML risk information and the second AML risk information for the user identifier, as a combined first AML risk information and second AML risk information; and sending, by the TEE, a combination result that comprises the combined first AML risk information and second AML risk information to each of the first institution and the second institution by using an oracle mechanism; and sending, by the TEE, a proof of the combination result to a blockchain network, wherein the proof comprises a verifiable claim comprising a signature of the TEE and a third digest value obtained through performing a hash calculation on the combination result.

7. The non-transitory, computer-readable medium of claim 6, wherein the user identifier of the first user comprises an account registered by the first user at the first institution or assigned to the first user by the first institution in response to an operation initiated by the first user at the first institution, and wherein the user identifier of the second user comprises an account registered by the second user at the second institution or assigned to the second user by the first institution in response to an operation initiated by the second user at the first institution.

8. The non-transitory, computer-readable medium of claim 6, wherein the first sharing request comprises a signature of the first institution, and the second sharing request comprises a signature of the second institution.

9. The non-transitory, computer-readable medium of claim 6, wherein the TEE is deployed with a smart contract, wherein the smart contract is configured to receive at least two sharing requests from at least two institutions.

10. The non-transitory, computer-readable medium of claim 6, wherein the operations comprise:
verifying, by the TEE, an identity of the first institution and an identity of the second institution.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a trusted execution environment (TEE), a first sharing request from a first institution, wherein the first sharing request comprises a user identifier of a first user and first anti-money laundering (AML) risk information of the first user, and wherein the user identifier of the first user comprises a first digest value obtained through performing a hash calculation on one or more pieces of information of the first user;
receiving, by the TEE, a second sharing request from a second institution, wherein the second sharing request comprises a user identifier of a second user and second AML, risk information of the second user, and wherein the user identifier of the second user comprises a second digest value obtained through performing the hash calculation on one or more pieces of information of the second user, the second institution being different from the first institution;
determining, by the TEE, that the first sharing request comprises at least one first risk label and that the second sharing request comprises at least one second risk label, each of the at least one first risk label and the at least one second risk label comprising at least one of a corresponding suspicious transaction report (STR) crime label or a corresponding money-laundering risk level label, the at least one first risk label being labeled by the first institution to the first user based on at least one of basic data of the first user or historical transactions of the first user, the at least one second risk label being labeled by the second institution to the second user based on at least one of basic data of the second user or historical transactions of the second user;
determining, by the TEE, that the first sharing request comprises the first AML risk information and the second sharing request comprises the second AML risk information based on the at least one first risk label and the at least one second risk label, the first AML risk information corresponding to the user identifier of the first user and comprising information associated with the at least one first risk label, the second AML risk information corresponding to the user identifier of the second user and comprising information associated with the at least one second risk label;
in response to determining that the first sharing request comprises the first AML risk information and the second sharing request comprises the second AML risk information, determining, by the TEE, whether the user identifier of the first user matches the user identifier of the second user based on the first digest value and the second digest value;
in response to that the user identifier of the first user matches the user identifier of the second user, combining, by the TEE in plaintext form, the first AML, risk information and the second AML risk information for the user identifier, as a combined first AML risk information and second AML risk information; and
sending, by the TEE, a combination result that comprises the combined first AML risk information and second AML risk information to each of the first institution and the second institution by using an oracle mechanism; and
sending, by the TEE, a proof of the combination result to a blockchain network, wherein the proof comprises a verifiable claim comprising a signature of the TEE and a third digest value obtained through performing a hash calculation on the combination result.

12. The computer-implemented system of claim 11, wherein the user identifier of the first user comprises an account registered by the first user at the first institution or assigned to the first user by the first institution in response to an operation initiated by the first user at the first institution, and wherein the user identifier of the second user comprises an account registered by the second user at the second institution or assigned to the second user by the first institution in response to an operation initiated by the second user at the first institution.

13. The computer-implemented system of claim 11, wherein the first sharing request comprises a signature of the first institution, and the second sharing request comprises a signature of the second institution.

14. The computer-implemented system of claim 11, wherein the TEE is deployed with a smart contract, wherein the smart contract is configured to receive at least two sharing requests from at least two institutions.

15. The computer-implemented system of claim 11, wherein the one or more operations comprise:
verifying, by the TEE, an identity of the first institution and an identity of the second institution.

16. The computer-implemented method of claim 1, comprising:
in response to determining that the first sharing request comprises the first AML, risk information and the second sharing request comprises the second AML risk information, determining, by the TEE, whether each of the first AML risk information and the second AML risk information satisfies a predefined rule, and
in response to determining that each of the first AML risk information and the second AML risk information satisfies the predefined rule, determining, by the TEE, whether the user identifier of the first user matches the user identifier of the second user based on the first digest value and the second digest value.

17. The non-transitory, computer-readable medium of claim 6, wherein the operations comprise:
in response to determining that the first sharing request comprises the first AML risk information and the second sharing request comprises the second AML risk information, determining, by the TEE, whether each of the first AML risk information and the second AML risk information satisfies a predefined rule, and
in response to determining that each of the first AML risk information and the second AML risk information satisfies the predefined rule, determining, by the TEE, whether the user identifier of the first user matches the user identifier of the second user based on the first digest value and the second digest value.

18. The computer-implemented system of claim 11, wherein the one or more operations comprise:

in response to determining that the first sharing request comprises the first AML risk information and the second sharing request comprises the second AML risk information, determining, by the TEE, whether each of the first AML risk information and the second AML risk information satisfies a predefined rule, and in response to determining that each of the first AML risk information and the second AML risk information satisfies the predefined rule, determining, by the TEE, whether the user identifier of the first user matches the user identifier of the second user based on the first digest value and the second digest value.

19. The computer-implemented method of claim 1, wherein the first sharing request comprises a first distributed digital identity (DID) of the first institution in a blockchain platform, and the second sharing request comprises a second DID of the second institution in the blockchain platform, wherein the combination result comprises the first DID of the first institution and the second DID of the second institution, and wherein the computer-implemented method further comprises:

before sending the combination result to each of the first institution and the second institution, verifying an identity of the first institution based on the first DID of the first institution and an identify of the second institution based on the second DID of the second institution.

20. The computer-implemented method of claim 1, wherein the TEE is created on a blockchain node of the blockchain network and comprises a portion of a memory of the blockchain node, wherein the portion of the memory is encrypted by a memory encryption engine comprised in a processor of the blockchain node.

\* \* \* \* \*

UNITED STATES PATENT AND TRADEMARK OFFICE
CERTIFICATE OF CORRECTION

PATENT NO. : 11,954,686 B2
APPLICATION NO. : 17/364719
DATED : April 9, 2024
INVENTOR(S) : Xinmin Wang et al.

Page 1 of 1

It is certified that error appears in the above-identified patent and that said Letters Patent is hereby corrected as shown below:

In the Claims

Column 20, Line 65, Claim 1, please replace "AML," with -- AML --;

Column 22, Line 10, Claim 6, please replace "AML," with -- AML --;

Column 23, Line 22, Claim 11, please replace "AML," with -- AML --;

Column 23, Line 66, Claim 11, please replace "AML," with -- AML --;

Column 24, Line 41, Claim 16, please replace "AML," with -- AML --;

Column 26, Line 9, Claim 19, please replace "identify" with -- identity --.

Signed and Sealed this
Fourth Day of June, 2024

Katherine Kelly Vidal
*Director of the United States Patent and Trademark Office*